Patented Jan. 19, 1937

2,068,051

UNITED STATES PATENT OFFICE 2,068,051

FOOD PRODUCT

Tracy M. Canton and Wilbur B. Tucker, Grand Rapids, Mich., assignors to Nunut Foods, Inc., Plainwell, Mich., a corporation of Michigan No Drawing. Application June 18, 1936, Serial No. 85,885

4 Claims. (Cl. 99—126)

The present invention relates to food products, and its object is to provide a food product of superior nutritious and palatable quality and a method of making the same.

This food product contains nut meats or nut butter, a starch substance and a lactic liquid, with which may be combined sweetening and flavoring or seasoning elements as desired, the solids being finely comminuted and with the liquid or soluble matters thoroughly dissolved or mixed in water and reduced to a homogeneous compound.

Any of the well known nuts, as black walnuts, almonds, cashew nuts, peanuts and the like may be used; arrowroot is preferable as the starch content; the base of the lactic liquid should contain 32 per cent or more butter fat; while the seasoning or flavoring element may be table salt, white parsley, white pepper, lemon juice, sugar, etc.

The ingredients are combined in approximately the following proportions in making the following illustrative example of our product: 1 lb. avoirdupois, butter of roasted blanched or raw unblanched nut meats; 4 ozs. avoirdupois, Bermuda crystallized arrowroot; 1 gal. of water; and sufficient sweet cream, seasoning and flavoring as may be desired for the various uses of this food product, about two fluid ounces of the sweet cream being desirable.

A preferable method of combining the ingredients in making this product includes the following acts: the flavoring or seasoning elements are by agitation thoroughly mixed, dissolved or held in suspension in about two quarts of water at a temperature of approximately 195 degrees Fahr.; the cream and the starch element (arrowroot) are by agitation thoroughly mixed, dissolved or held in suspension in about one quart of cold water; the said mixtures are then combined and maintained at approximately 195 degrees Fahr. long enough to completely break down or flow the starch particles for thoroughly and uniformly uniting the ingredients of these two mixtures; the finely comminuted nut meats or nut butters are by agitation thoroughly mixed, dissolved or held in suspension in about one quart of water at a temperature of approximately 195 degrees Fahr. Thereupon the three mixtures are thoroughly mixed or united. Thus the nut element (the finely comminuted nut meats or nut butter) is not only uniformly distributed in the starch element but is held thereby in such uniformly distributed relation therewith and with the other ingredients.

Before the final cooking and sterilizing of this food product it should be subjected to a pressure of about 3500 pounds per square inch to reduce the same to a degree of viscosity and of a homogeneous consistency sufficient to prevent separation of the ingredients and to provide a condensed food product. This may be accomplished by running the thoroughly dissolved or mixed batch through a viscolizer or homogenizer immediately before sealing the product, by a commercial vacuum pack method, in suitable cans or containers ready for the final cooking and sterilizing.

Thereupon the sealed product is placed in a commercial retort or autoclave and cooked and sterilized at about 240 degrees Fahr. for nearly an hour which may tend to separate the ingredients from said condensed condition. The canned product after cooling should be thoroughly mixed by agitation in order to restore or recluster the ingredients into their said condensed or homogeneous condition.

To suit individual tastes and preferences, the ingredients, their relative proportions and the method of combining them may be somewhat varied without departing from the essential character thereof.

This product may be used for soups, salads, pies, puddings, muffins or other bread products, ice cream or frozen puddings, cake frosting, etc.

We claim:

1. A sterilized canned nut food product, including finely comminuted nut meat and crystallized arrow root starch which binds and controls the nut oils and enables the nut meat to be sterilized in a smooth homogeneous food product.

2. A sterilized canned nut food product, including finely comminuted nut meat and crystallized arrowroot starch which binds and controls the nut oils and enables the nut meat to be sterilized in a smooth homogeneous food product, and a lactic liquid to assist in forming a solvent for the crystallized starch.

3. A method of making a sterilized canned nut meat product including mixing a quantity of crystallized arrowroot starch and cream with cold water and then raising the temperature of the mixture to approximately 195 degrees F. to cause the starch to flow, mixing comminuted nut meat with water and adding the same to the starch mixture and then bringing the temperature of the mass to said starch flowing temperature and agitating the same to cause a thorough mixture of the ingredients.

4. A method of making a sterilized canned nut meat product including mixing a quantity of crystallized arrowroot starch and cream with cold water and then raising the temperature of the mixture sufficiently to cause the starch to flow, mixing comminuted nut meat with water and adding the same to the starch mixture and then bringing the temperature of the mass to said starch flowing temperature and agitating the same to cause a thorough mixture of the ingredients, homogenizing the product, canning the product, subjecting the canned product to a sterilizing heat, cooling to normal temperature and agitating the canned product.

TRACY M. CANTON.
WILBUR B. TUCKER.